(12) United States Patent
Marr et al.

(10) Patent No.: US 9,471,784 B1
(45) Date of Patent: *Oct. 18, 2016

(54) AUTOMATED FIRMWARE SETTINGS VERIFICATION

(71) Applicant: Amazon Technologies, Inc., Reno, NV (US)

(72) Inventors: Michael David Marr, Monroe, WA (US); Anirudh Balachandra Aithal, Seattle, WA (US); Matthew David Klein, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 503 days.

This patent is subject to a terminal disclaimer.

(21) Appl. No.: 13/706,839

(22) Filed: Dec. 6, 2012

(51) Int. Cl.
*G06F 21/57* (2013.01)

(52) U.S. Cl.
CPC .................................. *G06F 21/572* (2013.01)

(58) Field of Classification Search
CPC .............. G06F 8/61; G06F 8/65; G06F 8/66; G06F 8/665; G06F 9/455; H04L 67/34; H04L 41/0813
See application file for complete search history.

(56) References Cited

U.S. PATENT DOCUMENTS

| | | | |
|---|---|---|---|
| 7,818,515 B1 * | 10/2010 | Umbehocker et al. | 711/154 |
| 8,583,769 B1 * | 11/2013 | Peters et al. | 709/221 |
| 2001/0042243 A1 * | 11/2001 | Fish et al. | 717/6 |
| 2005/0021723 A1 * | 1/2005 | Saperia | 709/223 |
| 2005/0289071 A1 * | 12/2005 | Goin et al. | 705/56 |
| 2006/0069534 A1 | 3/2006 | Kinney | |
| 2007/0074199 A1 * | 3/2007 | Schoenberg | 717/168 |
| 2008/0154957 A1 * | 6/2008 | Taylor et al. | 707/104.1 |
| 2008/0208365 A1 * | 8/2008 | Grgic et al. | 700/2 |
| 2009/0013321 A1 * | 1/2009 | Mattiocco et al. | 718/1 |
| 2010/0145671 A1 * | 6/2010 | Allstrom et al. | 703/21 |
| 2010/0217843 A1 * | 8/2010 | Dehaan | G06F 8/65 709/221 |
| 2011/0022192 A1 * | 1/2011 | Plache et al. | 700/28 |
| 2012/0124572 A1 * | 5/2012 | Cunningham et al. | 718/1 |

OTHER PUBLICATIONS

U.S. Appl. No. 13/706,729, filed Dec. 6, 2012, Marr et al.
U.S. Appl. No. 13/706,779, filed Dec. 6, 2012, Marr et al.

* cited by examiner

*Primary Examiner* — Kim Huynh
*Assistant Examiner* — Brandon Kinsey
(74) *Attorney, Agent, or Firm* — Baker & Hostetler LLP

(57) ABSTRACT

Systems and methods are described for managing computing resources. In one embodiment, data representative of an abstracted firmware framework is maintained. The data may comprise computing firmware settings and determined based on standardized associations between vendor-specific firmware settings and abstracted firmware settings that are independent of the vendor-specific firmware settings. In response to receiving a request for a computing firmware setting, the requested computing firmware setting is translated to one or more vendor-specific firmware settings based on the data. A computing resource capable of implementing the one or more vendor-specific firmware settings is identified.

17 Claims, 7 Drawing Sheets

AUTOMATED FIRMWARE SETTINGS VERIFICATION

BACKGROUND

A data center is a facility that houses computer systems and various networking, storage, and other related components. Many organizations and businesses operate and maintain data centers to provide computing and information services to support their day-to-day operations. Data centers may also provide computing services on a permanent or an as-needed basis to businesses and individuals as a remote computing service or to provide "platforms as a service" or "software as a service" (e.g., cloud computing). The computing resources provided by a data center may include various types of resources, such as data processing resources, data storage resources, data communication resources, and the like.

To facilitate increased utilization of data center resources, virtualization technologies may allow a single physical computing machine to host one or more instances of virtual machines (VMs) that appear and operate as independent computer machines to a remotely connected computer user. With virtualization, the single physical computing device can create, maintain, or delete virtual machines in a dynamic manner. When a customer of a data center requests a new virtual machine instance, the data center may provide a virtual machine management service that identifies a "slot" for executing the new instance. Customers may sometimes request changes to a virtual machine instance or request a particular configuration. Some changes may require updates to firmware—a combination of software and hardware such as a hardware device with data stored in read-only memory.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

The following detailed description is directed to technologies for providing a service that implements one or more levels of abstraction for updating various computer firmware settings. Many computer settings can only be altered, for example, via firmware or Basic Input/Output System (BIOS) updates that may be vendor specific. One issue that may arise when altering such settings is during testing of new hardware or when operating hardware in a computing environment such as a data center. In the examples described herein, a data center is one example environment in which the described embodiments can be implemented. However, the described concepts can apply generally to other computing environments, for example across multiple data centers or locations.

Because of the limitations typically involved with modifying firmware settings, it can be difficult to automate the testing and verification of settings that are controlled by firmware such as, for example, Non-Uniform Memory Access (NUMA), memory speed, power settings, and the like. It can also be difficult to automate and manage the configuration of such firmware settings in a production capacity.

The present disclosure describes a firmware abstraction mechanism for a service that provides one or more levels of abstraction for changing various firmware settings. Such a firmware abstraction mechanism can include the creation and management of workflows for firmware settings by querying and changing firmware settings, mapping the settings to specific hardware, changing and managing the settings in a controlled manner, and removing/bringing affected devices back into service. The firmware abstraction mechanism can be used as part of a test workflow for verifying performance and operation of different firmware configurations. The firmware abstraction mechanism can also be used as part of a production workflow to configure capacity at runtime so that various system configurations with different firmware settings can be available for customers.

Figure 1:
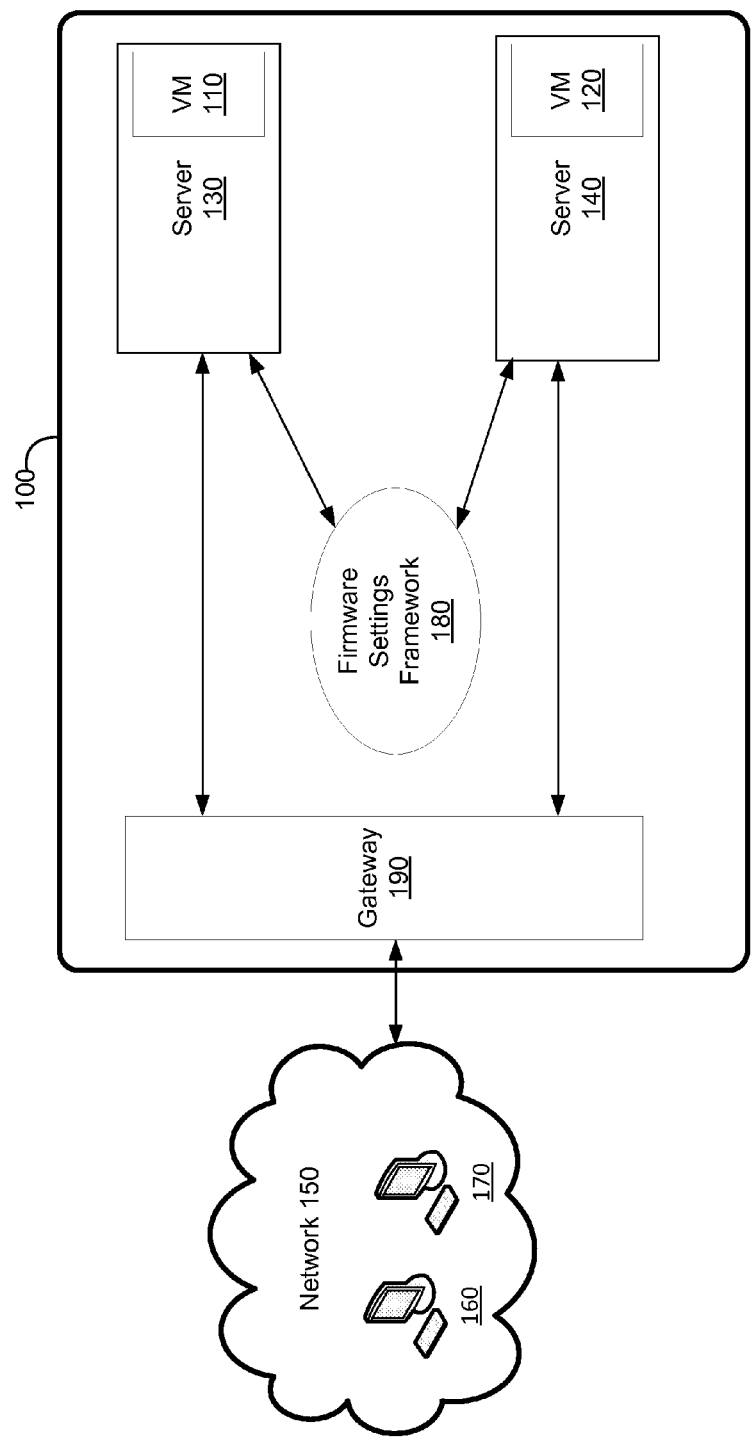
FIG. 1 is a diagram illustrating a mechanism for providing a firmware settings framework in accordance with the present disclosure.

FIG. 1 is a diagram illustrating a computing environment 100 including a mechanism for providing a firmware abstraction framework in accordance with the present disclosure. In the present disclosure, a firmware abstraction mechanism may also be referred to as a firmware abstraction framework or a firmware settings framework. The terms may be used interchangeably. Referring to FIG. 1, computing environment 100 may include virtual machine instances 110 and 120 that may execute, for example, on one or more server computers 130 and 140. It will be appreciated that some embodiments may involve additional virtual machine instances that may be instantiated on additional server computers in computing environment 100.

FIG. 1 also illustrates a public network 150 that may include one or more computing devices such as computers 160 and 170. According to one embodiment, virtual machine instance 110 may be configured to provide computing services to a computer user (not shown) of public network 150 via a gateway 190 and computers 160 and 170. For example, virtual machine instance 110 may provide a set of remote access enterprise applications to a group of users who may, for example, be employees of an enterprise customer.

A user, administrator, service or any computing resource in computing environment 100 may send a request to a firmware settings framework 180 for a resource instance with a particular firmware setting. In one embodiment, firmware settings framework 180 may maintain a record of groupings of computing resources that have been determined to be capable of meeting a predetermined baseline firmware configuration. By maintaining such groupings, computing firmware settings framework 180 can efficiently identify and allocate computing resources for responding to firmware setting requests. Such settings may be requested directly by a customer of the data center, by an administrator of the data center, a service or any computing resource within the data center such as server 130. Server 130 may also send a request on behalf of itself, or on behalf of other servers.

In response to the request for firmware settings, firmware settings framework 180 may access a list of available firmware baseline configurations. As used herein, firmware can be any combination of software and hardware, typically programs or data written in permanent storage (e.g., read-only memory (ROM), programmable read-only memory (PROM), erasable programmable read-only memory (EPROM), NAND or other non-volatile storage on a device). The list of available firmware baseline configurations may be prioritized based on factors such as cost and policy information. Firmware settings framework 180 may also access information describing verification results and verification schedules. Firmware settings framework 180 may send information regarding the available firmware baseline configurations to the requestor.

In some embodiments, firmware settings framework 180 may receive a request for one or more firmware capacity groupings based on a new firmware setting. In response, firmware settings framework 180 may determine which, if any, of the plurality of available firmware capacity groupings that may already be able to provide the new firmware setting. Firmware settings framework 180 may determine that such a grouping already exists by reviewing the list of available firmware baseline configurations and requirements for verification of the new firmware setting. If such a grouping does not exist, then firmware settings framework 180 may perform, or cause performance, of one or more verification tasks to determine that the new firmware setting meets established performance and capacity requirements. Once verification has been performed, a new grouping can be formed consisting of resources that have incorporated the new firmware setting. If such a grouping already exists, then firmware settings framework 180 may send information to the requestor regarding the existing grouping and the members of the group.

In some embodiments, firmware settings framework 180 may send information regarding requirements for verification of the new firmware setting to a resource such as server computer 130 if the new firmware setting is to be incorporated in the resource. The resource may perform verification tasks and send the results of the verification tasks to firmware settings framework 180. Firmware settings framework 180 may then approve or disapprove the results and create a firmware capacity grouping. As an example, a server computer may be configured to support VM instances with a baseline configuration that includes a specified firmware setting. The server computer will not be able to host VM instances with a different firmware setting requirement unless the server computer's firmware settings have been changed. Once the server computer has been changed and the update has been verified, firmware settings framework 180 can determine that the server computer can now support VM instances with the updated setting requirement. Firmware settings framework 180 can then include the server computer in a capacity pool of server computers that can support such VM instances.

As described above, firmware is typically specific to vendor implementation. One of the issues raised by settings that are firmware dependent is the testing of computing configurations. To thoroughly test computing configurations, it is desirable to iterate test conditions through the various possible firmware settings. Firmware settings may require vendor specific procedures or necessitate the reboot of hardware to a particular execution environment. After such changes, another reboot may be required. Some devices may provide a number of firmware customization settings that may be accessed through various means. Some examples of firmware controlled settings include the enabling of clock frequency scaling (e.g., Intel Turbo), symmetric multithreading (e.g., Intel hyper-threading) and NUMA settings.

In a data center environment, it is desirable to test computing configurations by iterating through various settings—including firmware settings—in a controlled way to determine optimal settings for a particular workload or VM instance type. When new hardware configurations are added in response to requests for unique firmware settings, fleet fragmentation and proliferation can result. By testing computing configurations, it is possible to achieve greater integration of the computing configuration into the data center's products and services. And by testing a variety of configurations, a given set of hardware may be determined to be able to support a number of different firmware settings. Pools or groupings of computing resources can be identified based on such capabilities and maintained based on frequently used settings and configurations.

In some cases a customer may request a particular setting that requires a change to a firmware setting that is not currently provided by the data center. A service in the data center may be implemented in one or more computing devices. The service may be configured to determine a suitable computing device can potentially accommodate the setting, initiate a workflow to update and validate the particular setting, and report that the update has been incorporated when the computing device is ready to provide the particular setting to the customer. The particular setting may also be made available to other customers who may request similar settings.

In various embodiments, a firmware abstraction framework such as firmware settings framework 180 of FIG. 1 may be implemented in one or more computing devices and configured to receive requests for computing settings and determine one or more firmware settings that will incorporate the requested computing setting. For example, the firmware abstraction framework may map requests for computing settings to actual settings that can be implemented in firmware settings (e.g., NUMA to "interleaved memory").

The firmware abstraction framework may create workflows to update and validate specific settings on specific resources (i.e., servers). The firmware abstraction framework may identify one or more resources that already includes the requested setting or identify one or more settings that can be updated to provide the requested setting. For example, the firmware abstraction framework may track pools of resources (i.e., servers) that can support a given settings configuration. The firmware abstraction framework may create also workflows to update and validate specific settings on specific computing resources.

The firmware abstraction framework may also be configured to optimize the placement for requested resources that have particular firmware settings requirements based on various factors such as minimization of disruption to existing services. The firmware framework may thus manage data center workflows to optimize the firmware updates and computing resource tracking capabilities.

Management of the firmware setting is also useful for managing devices that are associated with firmware updates such as flash storage devices. For example, flash devices have variations in write endurance and a firmware framework can track and manage the number of write/erase cycles on the devices and limit or throttle the number of times firmware is updated on a particular device.

Firmware settings can be an important aspect of correct operation of the operating system, and an incorrect or incompatible setting can disable a computing resource or otherwise render it unusable. Furthermore, firmware settings have the potential to cause physical damage to devices or to affect hardware reliability because the firmware settings can set controls for hardware such as clock rate and thermal throttling. The firmware abstraction framework can be configured to manage such hardware settings so that failure can be minimized. For example, the firmware abstraction framework can determine how often to perform firmware updates on a given device and the conditions for testing the firmware settings. The firmware abstraction framework can also look for settings that may result in various blacklist behaviors that are to be avoided by the managed devices.

As discussed above, firmware is often vendor specific, and in one embodiment the firmware abstraction framework can implement an application programming interface (API) to provide an interface by which vendor specific settings can be translated or "mapped" into a set of abstracted settings that are not vendor specific. In this way, customers need only identify the abstracted firmware settings and need not be concerned with hardware specific settings that may vary across vendors. Such an API can implement interfaces for common denominators across a data center's computing resources in a way that provides commonality and long-term compatibility for firmware settings regardless of the data center's hardware resources at any given time.

In some embodiments, the firmware abstraction framework may be configured to interact with a test framework that implements a mechanism for tests and verification of assets in a data center. For example, when a request for a computing setting is received and it is determined that the computing setting requires firmware changes that have not been previously verified, the firmware abstraction framework can identify a set of firmware settings that needs to be tested and verified to confirm that the settings meet data center criteria. The firmware abstraction framework can also determine which of the settings are best suited to comply with the requested computing setting. The firmware settings to be tested can be sent to a test service to carry out the tests.

In some embodiments, the firmware abstraction framework may be configured to include an expert system and a knowledge base to provide a decision-making capability regarding the search and selection of firmware settings. The expert system can consider factors such as system throughput, processor utilization, and network bandwidth. Furthermore, the firmware abstraction framework may employ one or more fitness functions to determine how close a given configuration is to achieving one or more system criteria. A configuration management mechanism may be used to perform permutation testing and determine optimal search settings. In one embodiment, a genetic algorithm may be used as a search heuristic to efficiently determine searches for satisfactory firmware settings. In other embodiments, other search functions or combinations of search functions can be used, such as a simulated annealing algorithm or a Hidden Markov Model algorithm.

In one example use case, a customer may request options for implementing a computing resource. In response, the firmware abstraction framework may determine if the data center has the capacity to fulfill the request and select a suitable computing device. The firmware abstraction framework may take the computing device out of service, update the firmware and reboot the computing device. The firmware abstraction framework may then perform verification of the changes, and update configuration information to track the new configuration.

The firmware abstraction framework can include a workflow management component that may be configured to select candidate computing devices or resources and to move VM instances between computing devices as necessary.

In some embodiments, the firmware abstraction framework can also include a billing component. In one embodiment, a pricing structure can be determined based on the settings selected by a customer. For example, a baseline price can be charged for standard computing configurations, and a premium price may be charged for special configurations that are not supported by a standard resource pool or an existing resource and otherwise result in special provisioning to accommodate the request. For example, the dedication of a computing device with a unique configuration may result in an underutilization of the device, especially if additional VM instances cannot be hosted on the device. The premium price can include a set fee or an hourly premium or a combination of the two.

Thus in various embodiments the firmware abstraction framework may be used to update and manage firmware changes across the entire fleet of computing resources in a data center.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 2:
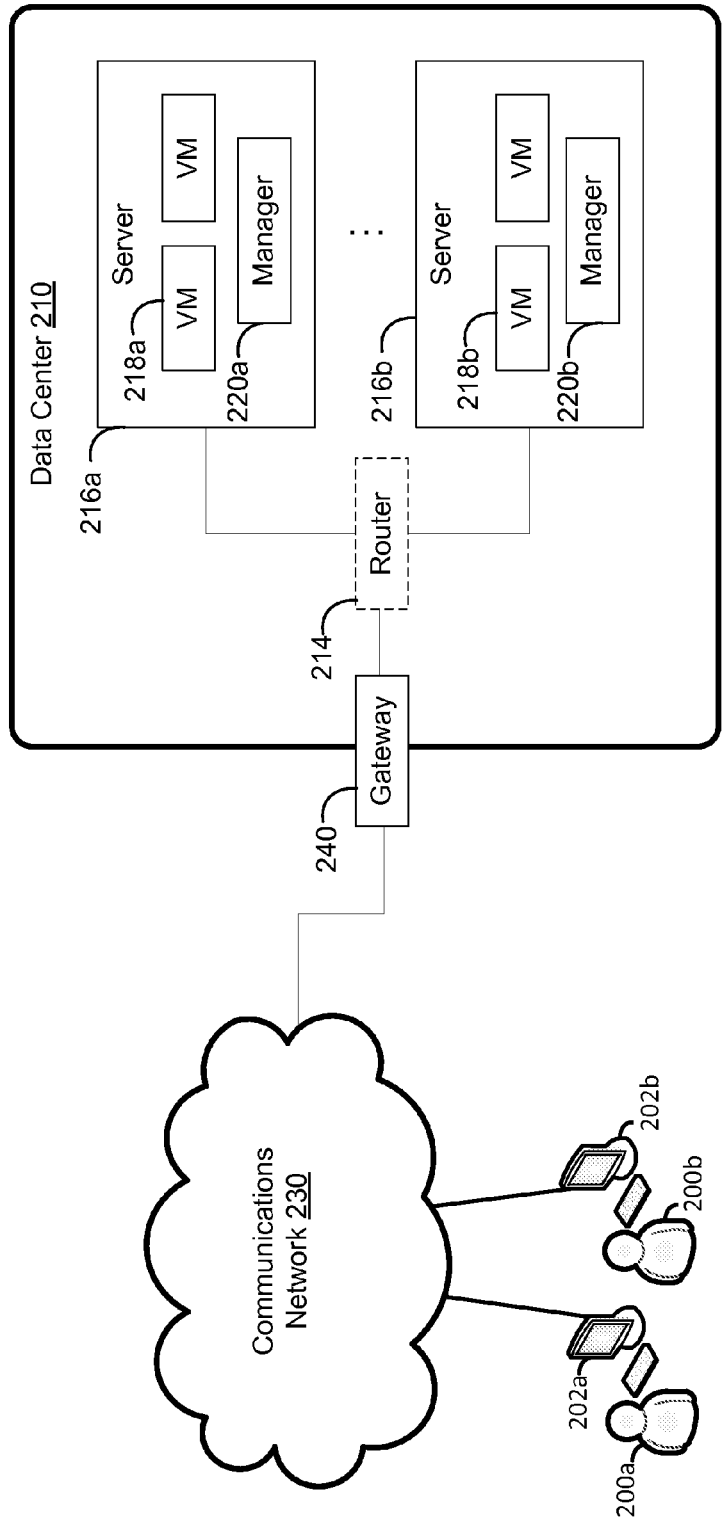
FIG. 2 illustrates an example computer system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may, for example, correspond to computing environment 100 in FIG. 1.

Data center 210 may be configured to provide computing resources for executing applications on a permanent or an as-needed basis. The computing resources provided by data center 210 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of computing resource may be available in different sizes, such as large resources—consisting of many processor cores, large amounts of memory, and/or large storage capacity—and small resources—consisting of fewer processor cores, smaller amounts of memory, and/or smaller storage capacity. Customers may choose to allocate a number of small processing resources as Web servers and/or one large processing resource as a database server, for example.

Data center 210 may include servers 216 (which may be referred herein singularly as "a server 216" or in the plural as "the servers 216") that provide computing resources available as virtual machine instances 218 (which may be referred herein singularly as "a virtual machine instance 218" or in the plural as "the virtual machine instances 218"). The virtual machine instances 218 may be configured to execute applications, including Web servers, application servers, media servers, database servers, and the like. Other resources that may be provided include data storage resources (not shown), and may include hard drives, solid state storage drives or other storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMWare or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by customers 200 or other customers of data center 210. For instance, user computer 202a or 202b may be a server, a desktop or laptop personal computer, a tablet computer, a wireless telephone, a personal digital assistant (PDA), an e-book reader, a game console, a set-top box, or any other computing device capable of accessing data center 210. User computer 202a or 202b may connect directly to the Internet (e.g., via a cable modem or a Digital Subscriber Line (DSL). Although only two user computers 202a and 202b are depicted, it should be appreciated that there may be multiple user computers.

User computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216 shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240, which is connected to communications network 230. Router 214 may manage communications within networks in data center 210, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, and other types of information. The deployment component utilizes the customer-provided configuration to launch and configure customer workloads on computing resources.

In computing environments such as those described herein, firmware is generally program code and data stored in persistent memory devices such as ROM, EPROM, or flash memory. Changing the firmware of a device can be a fairly infrequent occurrence in most cases. Firmware such as the ROM BIOS of a computer typically configure functions of a device's hardware. Although firmware configuration has important ramifications for the system's operating system and thus the computer system's operation, most systems lack a mechanism for updating and managing firmware in an automated and organized way. Firmware is typically updated manually using a utility program, usually during the bootup sequence. Some firmware in standalone devices rarely gets updated.

Computing devices, in particular in a data center scenario, may include a wide variety of hardware and software options that can be configured by firmware. A data center must track and manage the configurations, and verify compatibility between the different configurations. In an embodiment, an automated firmware abstraction framework may include one or more software layers for abstracting vendor specific firmware settings. In many computers, operating systems will run in conjunction with services provided by the system BIOS, which interfaces with the computing hardware. In various embodiments, an automated firmware abstraction framework may include one or more software layers that interacts with the system BIOS and other firmware utility programs using a standard interface. In an embodiment, the layers of the automated firmware abstraction framework provides an abstraction model to the systems that run on it by providing a set of services and functions that the executing systems can use. In this way, the executing systems need not deal with the specifics of the firmware but simply interact with the abstraction model.

By using the standard interfaces provided by the automated firmware abstraction framework, it is possible to make changes to the underlying computing devices and their firmware without updating software at higher levels. In this way, compatibility can be maintained across services provided in a data center while vendor specific changes are incorporated.

Some of the parameters that may be configured by an automated firmware abstraction framework may include, but are not limited to, memory interleaving, processor clock frequency scaling, NIC parameters, hard drive parameters, access modes, ports, and the like.

Figure 3:
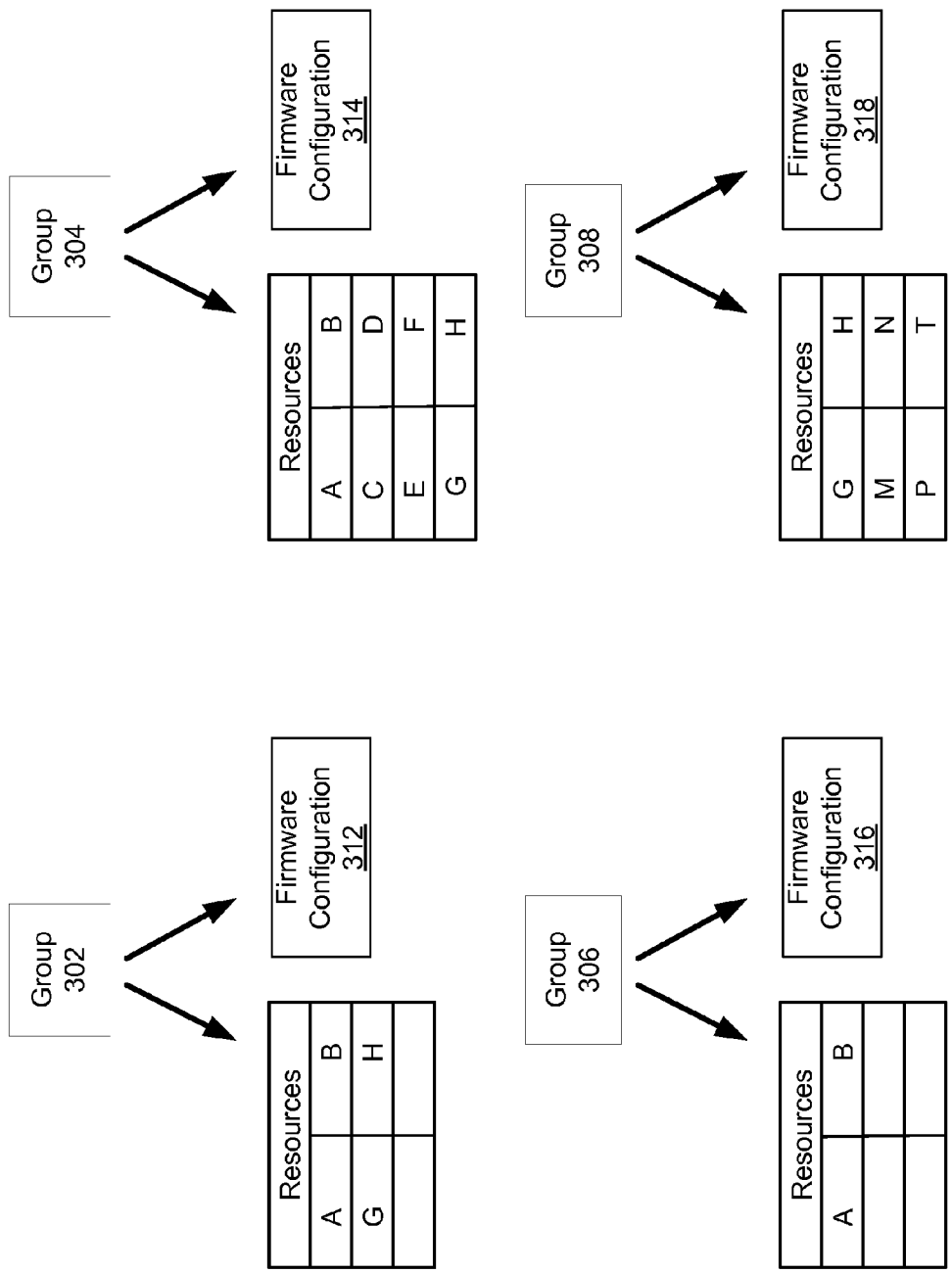
FIG. 3 is a diagram illustrating computing firmware groupings.

FIG. 3 illustrates one embodiment in which computing resources are managed using a firmware settings framework. FIG. 3 includes firmware configuration groupings 302, 304, 306, and 308 that each identify with one or more computing resources that meet or exceed the respective requirements for the respective firmware settings. In the figure, firmware configuration grouping 302 includes computing resources A, B, G, and H. Firmware configuration grouping 304 includes computing resources A, B, C, D, E, F, G, and H. Firmware configuration grouping 306 includes computing resources A and B. Firmware configuration grouping 308 includes computing resources G, H, M, N, P, and T. Each of the firmware configuration groupings 302, 304, 306, and 308 may be associated with respective minimum firmware configurations 312, 314, 316, and 318. As an example, firmware configuration 312 may require computing resources with a specified firmware setting for a particular processor. In one embodiment, membership in the firmware configuration groupings 302, 304, 306, and 308 may change as computing resources join new firmware configuration groupings or leave existing firmware configuration groupings.

Figure 4:
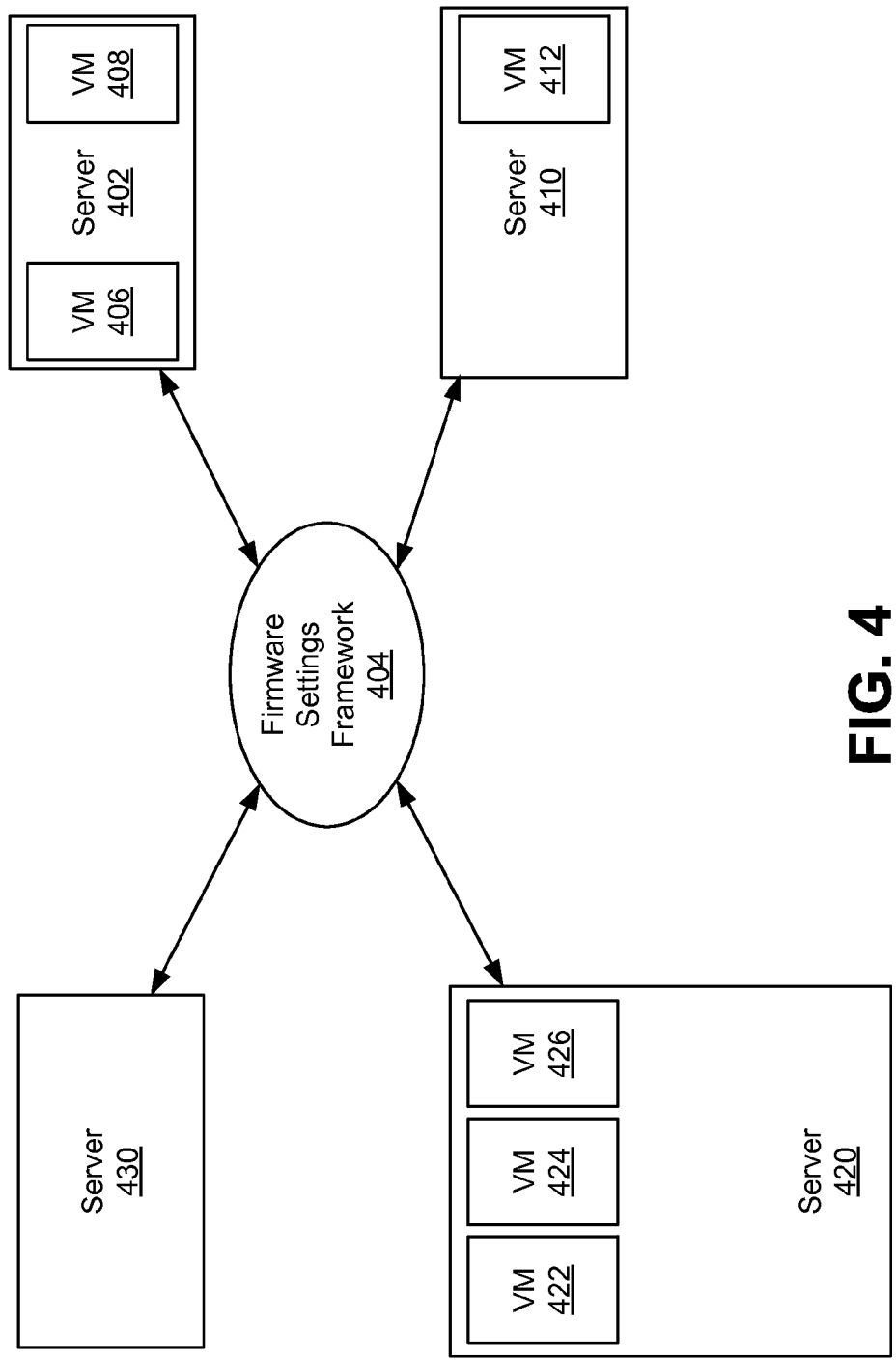
FIG. 4 is a diagram illustrating a mechanism for providing a firmware settings framework in accordance with the present disclosure.

FIG. 4 illustrates an example computing environment in which the embodiments described herein may be implemented. Referring to the figure, server computers 402, 410, 420, and 430 may communicate with a firmware settings framework 404 for access to computing firmware grouping information. Firmware settings framework 404 may in some embodiments correspond to firmware settings framework 180 as depicted in FIG. 1. Server computer 402 may host virtual machine instances 406 and 408. Similarly, server computer 410 may host virtual machine instance 412; and server computer 420 may host virtual machine instances 422, 424, and 426. Server computer 430 may be configured to provide other services and may not be executing a virtual machine instance.

Server computer 402 may send a request for an updated computing configuration to firmware settings framework 404. Firmware settings framework 404 may send information to server computer 402 indicating applicable computing firmware groupings, if any exist. If they do not exist, firmware settings framework 404 may identify requirements for establishing a grouping of server computers that can support the updated computing configuration. For example, requirements may include device hardware and any software or firmware that needs to be installed, or execution of a test to verify that a virtual computing instance of a particular type can function with updated computing configuration. The information may also indicate when evaluation tasks can be performed. For example, the information may include an evaluation schedule that minimizes potential disruptions to existing services being provided to customers.

In one embodiment, the information describing the computing firmware groupings may be prioritized based on one or more criteria. For example, the computing firmware groupings may be prioritized based on costs associated with providing the computing firmware groupings, or based on policies such as which computing firmware groupings have the highest demand.

In some embodiments, the request for the updated computing configuration may be sent to firmware settings framework 404 from server computer 402 on behalf of one of the other server computers 410, 420, and 430. In other embodiments, a third party such as a service executing on one of the server computers 402, 410, 420, and 430, or executing on another computing device, may send the request on behalf of one or more of the server computers 402, 410, 420, and 430.

Firmware settings framework 404 may cause the conduct of an evaluation and determine which, if any, of the requirements that can be met or exceeded by existing server computers. For example, server computer 402 may be determined to be a candidate for incorporating the computing configuration and tasked with conducting an evaluation and determine which, if any, of the requirements that it can meet or exceed. Server computer 402 can optionally perform verification tasks that it can perform without jeopardizing its ability to continue uninterrupted hosting of its occupant VM instances since server computer 402 may already be a member of one or more computing firmware groupings and may currently host one or more virtual machines. Server computer 402 may also obtain additional details for verification from firmware settings framework 404 or from some other source indicated by firmware settings framework 180 in FIG. 1.

Server computer 402 may optionally send a request to join one or more computing firmware groupings to firmware settings framework 404. Server computer 402 may optionally include the cost of verifying server computer 402's ability to join each proposed computing firmware grouping. Firmware settings framework 404 may then evaluate the request and determine whether to allow server computer 402 to proceed. Firmware settings framework 404 can make this determination using a number of factors. For example, firmware settings framework 404 may assess global considerations such as the number of other server computers making requests and the number of available computing firmware groupings that may be rendered unavailable while server computer 402 as well as other server computers perform verification tests.

Firmware settings framework 404 may determine if the proposed computing firmware groupings can accept additional members, if any potential disruptions to existing services are acceptable, and make other determinations as necessary. Based on the determinations, firmware settings framework 404 may send an indication to proceed to server computer 402. Server computer 402, in response to receiving the indication to proceed, may then execute necessary verification tasks. The verification tasks may include, but are not limited to, running software tests, running VM instances or other workloads that simulate customer use cases, and gathering the results of the tests and use cases. Once the verification tasks have been completed, server computer 402 may send the results to firmware settings framework 404 for review of the results and determination as to which computing firmware groupings that server computer 402 will be allowed to join.

Firmware settings framework 404 may analyze the information provided by server computer 402 including the test results. Based on the received information and additional factors as necessary, the firmware settings framework 404 may approve or disapprove admission to one or more of the requested computing firmware groupings. Firmware settings framework 404 may, for example, consider admission approval/disapproval decisions based on the computing firmware groupings that still have room for additional server computers, availability objectives for various computing resources, and server administration policies. After sending the approval/disapproval information by firmware settings framework 404, server computer 402 may be designated as being associated with each of the approved computing firmware groupings. Firmware settings framework 404 may optionally disassociate server computer 402 from some computing firmware groupings. For example, firmware settings framework 404 may have implemented policies to remove server computers from less valuable/rare pools or overpopulated pools.

By using a predetermined set of baseline configurations and established tests for verifying compliance with the configurations, computing firmware groupings can be efficiently maintained and newly added functionality can be tracked by adding computing firmware groupings as needed. Additionally, instead of taking server computers offline and temporarily out of a computing firmware grouping to verify added functionality, verification tests can be structured so that server computers can run the tests while they are hosting virtual services and without disrupting the hosted services.

In some embodiments, firmware settings framework 404 can use policies and evaluation criteria to drive the computing firmware grouping population to support certain computing resource management objectives. In one embodiment, computing firmware groupings can be assigned different weights to influence requests submitted by server computers. For example, weights can be assigned so that computing firmware groupings are populated in a more cost effective manner according to administrative policies or to evacuate server computers that have been identified for eventual removal from service. For instance, older servers that are scheduled to be lease-returned can routinely be denied permission to join computing firmware groupings until the older servers eventually become unoccupied, at which point they can be lease-returned.

In some embodiments, computing firmware groupings can be managed so that various availability objectives can be achieved. For example, weights can be assigned to computing firmware groupings so that computing firmware grouping availability can provide that at any point in time, an attempt to find a computing firmware grouping that provides functionality set X has a Y % chance of succeeding. Data for determining the values of X and Y can be based on a predetermined policy. For example, one such policy may be that a predetermined amount of reserve instance capacity for a given set of attributes should be maintained. Other examples include ensuring that certain customer usage patterns can be supported. For example, one such usage pattern can be for each capacity pool containing instances owned by entity Z, the computing firmware groupings is managed such that an additional Q % of instances can be accommodated. As another example, firmware settings framework 404 can determine that the available servers in a certain computing firmware grouping are too low and should be increased. In other embodiments, historical data can be used to determine a computing firmware grouping management policy.

Firmware settings framework 404 may reside on one or more server computers or other computing resources in a data center. Firmware settings framework 404 may in some embodiments be managed by a VMM or other management software executing in the data center. Firmware settings framework 404 may also execute on one or more virtual machines.

Figure 5:
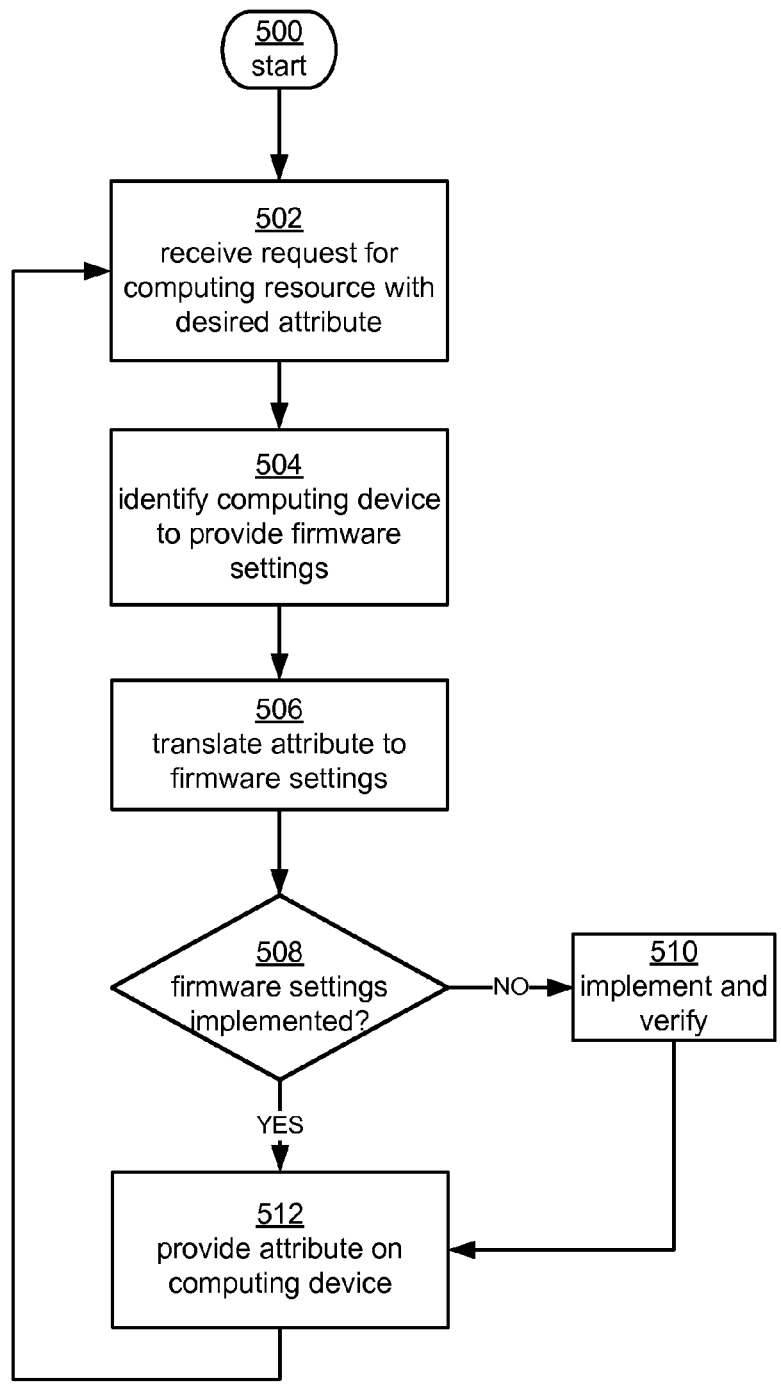
FIG. 5 is a flowchart depicting an example procedure for providing a firmware settings framework in accordance with the present disclosure.

FIG. 5 illustrates an example operational procedure for managing computing resources in a data center using a firmware settings framework. In an embodiment, a firmware settings framework can correspond to firmware settings framework 404 in FIG. 4 or firmware settings framework 180 in FIG. 1.

Referring to FIG. 5, operation 500 begins the operational procedure. Operation 500 may be followed by operation 502. Operation 502 illustrates receiving a request for a computing resource with a desired computing attribute. In an embodiment, the request may be received in a computing environment comprising a plurality of computing devices providing computing resources.

Operation 502 may be followed by operation 504. Operation 504 illustrates identifying at least one of the plurality of computing devices to provide the hardware-specific firmware settings. The requested computing resource may be deployed on the identified computing device.

Operation 504 may be followed by operation 506. Operation 506 illustrates translating the requested computing attribute to corresponding hardware-specific firmware settings on the identified computing device. In some embodiments, the translating may be performed based on predetermined relationships between hardware-specific firmware settings and abstracted firmware settings that correspond to the hardware-specific firmware settings.

Operation 506 may be followed by operation 508. If the firmware settings are not implemented on the identified computing device, then operation 508 may be followed by operation 510. Operation 510 illustrates implementing and verifying the hardware-specific firmware settings on the identified computing device. For example, the hardware-specific firmware settings can be verified on the identified computing device and the requested computing resource can be provided on the identified computing device. However, it is possible that the identified computing device with the hardware-specific firmware settings does not meet applicable requirements and the requestor may be informed that the desired computing attribute cannot be provided. In some embodiments, additional candidate computing devices may be identified and verified to select a device that can satisfy the applicable requirements.

If the firmware settings are implemented on the identified computing device, then operation 508 may be followed by operation 512. Operation 512 illustrates providing the requested computing resource on the identified computing device. Operation 512 may be followed by operation 502.

Figure 6:
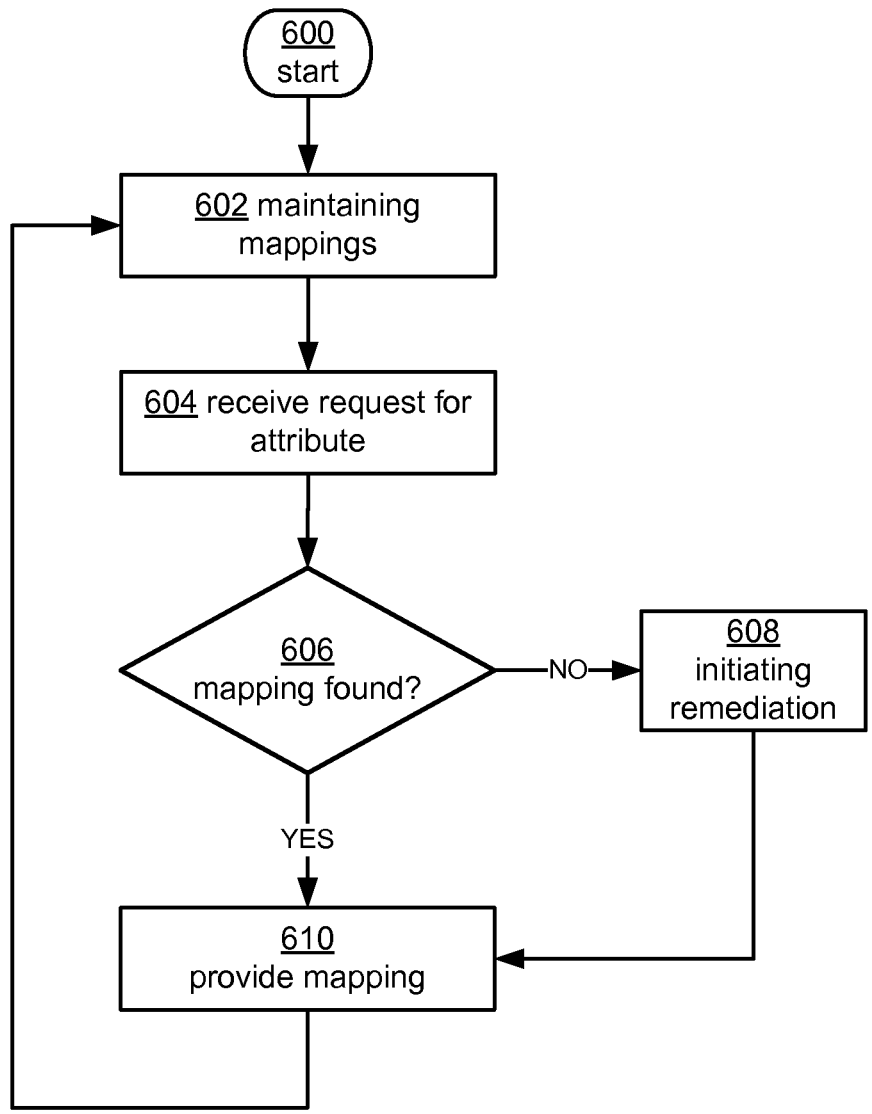
FIG. 6 is a flowchart depicting an example procedure for providing a firmware settings framework in accordance with the present disclosure.

FIG. 6 illustrates an example operational procedure for managing computing resources in a data center using a firmware settings framework. In an embodiment, a firmware settings framework can correspond to firmware settings framework 404 in FIG. 4 or firmware settings framework 180 in FIG. 1.

Referring to FIG. 6, operation 600 begins the operational procedure. Operation 600 may be followed by operation 602. Operation 602 illustrates maintaining mappings between a plurality of computing settings of a plurality of computing devices in a computing environment and corresponding firmware settings of the one or more computing devices in the computing environment. In one embodiment, the mappings may be representative of a relationship between hardware-specific firmware settings and abstracted firmware settings that are independent of the hardware-specific firmware settings. For example, the abstracted firmware settings may provide at least a degree of independence from specific hardware implementations by providing stable abstracted parameters that can be translated to a hardware-specific firmware settings without having to consider the details of the hardware-specific firmware settings.

Operation 602 may be followed by operation 604. Operation 604 illustrates receiving a request for a computing attribute related to one of the plurality of computing settings.

Operation 604 may be followed by operation 606. If it is determined that none of the mappings corresponds to the requested computing attribute, then operation 606 may be followed by operation 608. Operation 608 illustrates initiating a remediation process. In one embodiment, the remediation process can include causing execution of a process to create and verify a new mapping between the computing setting and one or more corresponding firmware settings. For example, the computing setting can be verified on a set of computing resources with a corresponding firmware setting and a new mapping can be added. However, it is possible that the requested updated configuration does not meet applicable requirements and the mapping can indicate that the requested updated configuration is not valid.

If a mapping does exist, then operation 606 may be followed by operation 610. Operation 610 illustrates selecting one of the mappings to provide the requested computing attribute. Operation 610 may be followed by operation 602.

Figure 7:
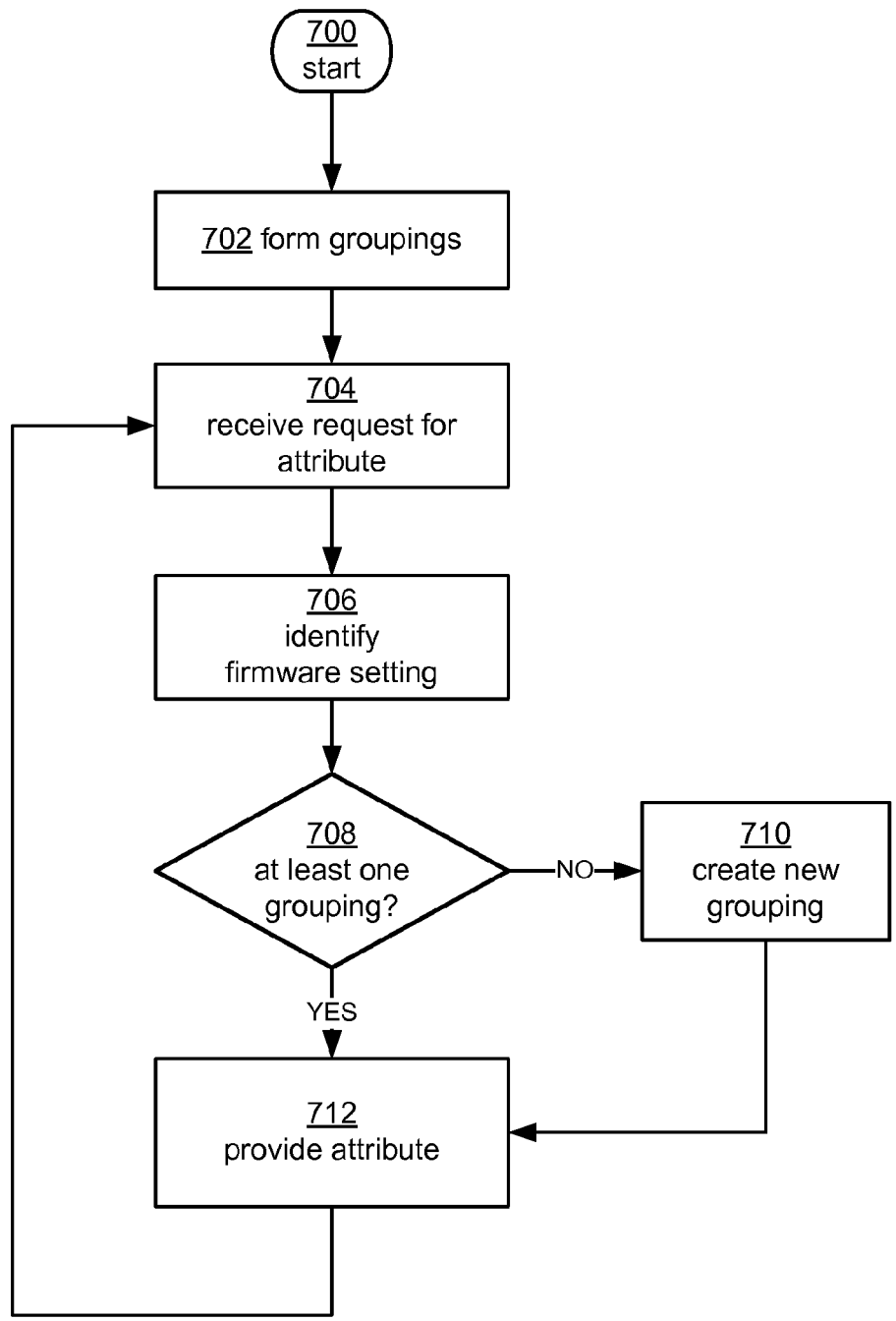
FIG. 7 is a flowchart depicting an example procedure for providing a firmware settings framework in accordance with the present disclosure.

FIG. 7 illustrates an example operational procedure for managing computing resources in a data center using a firmware settings framework. In an embodiment, a firmware settings framework can correspond to firmware settings framework 404 in FIG. 4 or firmware settings framework 180 in FIG. 1.

Referring to FIG. 7, operation 700 begins the operational procedure. Operation 700 may be followed by operation 702. Operation 702 illustrates forming groupings of computing devices in a computing environment comprising a plurality of computing devices providing computing resources. In one embodiment, the groupings may have common computing attributes corresponding to one or more firmware settings of an abstraction firmware framework. Additionally, the abstraction firmware framework may represent relationships between hardware-specific firmware settings and abstracted firmware settings that are independent of the hardware-specific firmware settings.

Operation 702 may be followed by operation 704. Operation 704 illustrates receiving a request for a computing attribute. Operation 704 may be followed by operation 706. Operation 706 illustrates identifying at least one of the firmware settings that correspond to the requested computing attribute.

Operation 706 may be followed by operation 708. If it is determined that none of the groupings can support the identified at least one firmware setting, then operation 708 may be followed by operation 710. Operation 708 illustrates creating a new grouping when it is determined that none of the groupings can support the identified at least one firmware setting.

If a grouping can support the identified at least one firmware setting, then operation 708 may be followed by operation 712. Operation 712 illustrates providing the requested computing attribute. For example, one of the computing devices in the grouping that can support the firmware setting can be selected to provide the requested computing attribute. Operation 712 may be followed by operation 704.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising at least one computing node and at least one data store in communication with the at least one computing node, the at least one data store having stored therein computer instructions, that upon execution by the at least one computing node, cause at least:

forming groupings of computing devices in a computing environment providing computing resources, the groupings having common computing attributes corresponding to one or more firmware settings of an abstraction firmware framework, the abstraction firmware framework having an associated interface for mapping relationships between hardware-specific firmware settings for a plurality of the computing devices and a plurality of selectable abstracted firmware settings that are translatable to the hardware-specific firmware settings, wherein the abstracted firmware settings are different from the hardware-specific firmware settings, wherein the abstracted firmware settings are not vendor-specific, and the abstracted firmware settings correspond to one or more desired computing attributes of the plurality of computing devices;

receiving a request for a selected abstracted firmware setting;

determining which of the groupings can support the selected abstracted firmware setting; and creating a new grouping when it is determined that none of the groupings can support the selected abstracted firmware setting, wherein the new grouping is based in part on verification that a computing device in the new grouping that has implemented the selected abstracted firmware setting meets or exceeds at least one performance criterion.

2. The computing system according to claim 1, wherein the groupings are based on at least one computing environment management criterion.

3. The computing system according to claim 2, wherein the at least one computing environment management criterion is a firmware grouping policy.

4. The computing system according to claim 1, further comprising implementing an expert system configured to provide a decision-making capability for forming the groupings.

5. A computer-implemented method for managing computing resources, comprising:

maintaining data representative of an abstracted firmware framework comprising computing firmware settings, the data determined based on standardized associations performed using an interface associated with the abstracted firmware framework, the associations between hardware-specific firmware settings of a plurality of the computing resources and a plurality of abstracted firmware settings that are independent of the hardware-specific firmware settings, wherein the abstracted firmware settings are different from the hardware-specific firmware settings, wherein the abstracted firmware settings are independent of the hardware-specific settings, and wherein the abstracted firmware settings correspond to one or more desired computing attributes;

verifying at least one of the hardware-specific firmware settings to confirm that it meets predetermined criteria;

receiving a request for a selected abstract firmware setting;

translating the requested selected abstract firmware setting to one or more vendor-specific firmware settings based on the data; and identifying a computing resource capable of implementing the one or more vendor-specific firmware settings.

6. The method of claim 5 wherein the hardware specific firmware settings include at least one of a basic input/output system (BIOS), a non-uniform memory access (NUMA), processor clock rate, processor clock frequency scaling, performance state or power state setting.

7. The method of claim 5 further comprising maintaining groupings of computing resources, each of the groupings comprising one or more computing resources that have a common set of computing firmware settings that have been incorporated and verified.

8. The method of claim 5 wherein the predetermined criteria includes a data center capacity management policy.

9. The method of claim 7, further comprising sending an indication to a source of the request as to which, if any, of the groupings have incorporated and verified the computing firmware settings.

10. The method of claim 8 wherein the data center capacity management policy is a target availability goal.

11. The method of claim 5 further comprising causing identification of at least one computing resource to incorporate and verify the selected abstract firmware setting and initiating at least one verification task to verify that the computing resource satisfies the predetermined criteria after incorporating the selected abstract firmware setting.

12. The method of claim 11 further comprising evaluating data received from the at least one computing resource and verifying that the computing resource satisfies the predetermined criteria after incorporating the selected abstract firmware setting.

13. The method of claim 5, further comprising using a fitness function to determine whether the at least one of the hardware-specific firmware settings meets the predetermined criteria.

14. One or more non-transitory computer-readable storage media having collectively stored thereon executable instructions that, when executed by one or more processors of a computer system, cause the computer system to:

receive a selected abstract firmware setting; and identify at least one computing resource capable of implementing firmware settings corresponding to the selected abstract firmware setting, the at least one computing resource identified based on a determination that one or more hardware-specific firmware settings incorporated on the at least one computing resource is compatible with the selected abstract firmware setting, wherein it is verified that the at least one computing resource satisfies predetermined criteria after implementation of the firmware settings, and wherein:

a plurality of abstract firmware settings are mapped using an interface of an abstraction firmware framework to a plurality of hardware-specific firmware settings for a plurality of computing resources;

the abstract firmware settings are different from the hardware-specific firmware settings, and the abstract firmware settings are independent of vendor-specific settings.

15. The computer-readable storage media of claim 14 further storing thereon executable instructions that, when executed by the one or more processors of a computer system, cause the computer system to adjust the firmware settings based on a fitness function.

16. The computer-readable storage media of claim 15 further storing thereon executable instructions that, when executed by the one or more processors of a computer system, cause the computer system to use at least one criterion as a performance goal.

17. The computer-readable storage media of claim 14 wherein performance testing is performed iteratively to identify a final set of firmware settings based on a fitness function.

\* \* \* \* \*